(12) United States Patent
Modras

(10) Patent No.: US 9,807,102 B1
(45) Date of Patent: Oct. 31, 2017

(54) REAL-TIME COMMUNICATION SUPPORT SYSTEM WITHIN A GROUP

(71) Applicant: Adam Modras, Playa del Rey, CA (US)

(72) Inventor: Adam Modras, Playa del Rey, CA (US)

( * ) Notice: Subject to any disclaimer, the term of this patent is extended or adjusted under 35 U.S.C. 154(b) by 0 days.

(21) Appl. No.: 15/415,572

(22) Filed: Jan. 25, 2017

Related U.S. Application Data

(60) Provisional application No. 62/376,768, filed on Aug. 18, 2016.

(51) Int. Cl.
| | | |
|---|---|---|
| *H04L 29/06* | (2006.01) | |
| *G06F 7/04* | (2006.01) | |
| *H04L 29/08* | (2006.01) | |
| *G10L 15/26* | (2006.01) | |

(52) U.S. Cl.
CPC .......... *H04L 63/105* (2013.01); *G10L 15/265* (2013.01); *H04L 67/10* (2013.01)

(58) Field of Classification Search
CPC ...... H04L 63/105; H04L 67/10; G10L 15/265
USPC ............................. 726/4, 1, 27; 713/165, 166
See application file for complete search history.

(56) References Cited

U.S. PATENT DOCUMENTS

| | | |
|---|---|---|
| 6,588,661 B2 | 7/2003 | Degrauwe et al. |
| 8,126,836 B2 | 2/2012 | Tirpak et al. |
| 9,374,378 B2 | 6/2016 | Wietfeld et al. |
| 2004/0081203 A1* | 4/2004 | Sodder .................. A61B 6/488 370/469 |
| 2009/0037443 A1 | 2/2009 | Athale et al. |
| 2010/0023878 A1 | 1/2010 | Douris et al. |
| 2010/0211642 A1 | 8/2010 | Campagna |
| 2010/0306827 A1* | 12/2010 | Esteve Balducci ... H04L 63/105 726/4 |
| 2012/0036209 A1 | 2/2012 | Lewis et al. |
| 2013/0054697 A1* | 2/2013 | Cha .................... H04N 21/2347 709/204 |
| 2013/0097481 A1* | 4/2013 | Kotler .................. G06F 17/241 715/230 |
| 2013/0246901 A1* | 9/2013 | Massand ................. G06F 17/24 715/229 |
| 2014/0282077 A1 | 9/2014 | Wilson et al. |
| 2014/0351716 A1* | 11/2014 | Steinbok ............... G06F 3/0484 715/753 |

(Continued)

*Primary Examiner* — Aravind Moorthy
(74) *Attorney, Agent, or Firm* — Intellent Patents, LLC; Ahmen Alhafidh

(57) ABSTRACT

A communication support system among a plurality of users within a hierarchical structure is disclosed herein. An electronic note may be transcribed using a computing device within an active session that has other authorized users. The communication support system may determine other devices authorized to receive electronic notes, at the end of each session all information is permanently deleted. Notes may be sent based a chain of command of those users in a session. Notes will be relayed based on an authorization level of each client computing devices and will be relayed when certain criteria are satisfied. The electronic note may be transmitted to a second client computing device based on the authorization level and the criteria being satisfied. The second computing device may then approve of and forward the electronic note to a relatively higher client computing device within the hierarchy, such as a third client computing device.

20 Claims, 10 Drawing Sheets

(56) References Cited

U.S. PATENT DOCUMENTS

2015/0100636 A1\* 4/2015 Hong ..................... H04L 67/02
  709/204
2015/0112995 A1\* 4/2015 Elyada .............. G06F 17/30867
  707/738

\* cited by examiner

REAL-TIME COMMUNICATION SUPPORT SYSTEM WITHIN A GROUP

CROSS-REFERENCE TO RELATED APPLICATIONS

This application is a non-provisional application which claims the benefit of Provisional Application No. 62/376,768 filed Aug. 18, 2016, the entire contents of which is hereby incorporated herein by reference.

BACKGROUND

In certain settings, such as in a courtroom environment, multiple users may need to communicate with each other. In this regard, paper notes may be physically handed between individuals, such as notes written on post-its, legal pad, loose-leaf paper, etc. Tens or hundreds of these notes may be passed amongst individuals on the team in order to secretly and securely relay information to other people within the team or party. Transferring a single note to a group of individuals may waste valuable time and may potentially allow the other parties to see who is knowledgeable about a specific topic in discussion. In addition, the contents of the note may not be fully secure in that wandering eyes of other non-party members could potentially view the written communication thereon.

SUMMARY

An electronic communication support system that provides real-time communication between and amongst members of a team or party is disclosed herein. For instance, a hierarchy of users within an application may be generated that allows users to create notes using his or her computing device and transmit the note to other users. The transmission and writing of the notes may be done in real-time, that is, receiving users are able to view notes as they are being written.

Furthermore, users may only be authorized to communicate with other users according to the respective user's authorization level, which may be associated with the user's computing device. For example, a low-level user may only be able to transmit notes to a mid-level user, in which case the low and mid level users will be able to correspond about the same channel. The mid-level user is able to correspond back and forth with the low-level user as well about the channel. The mid-level user may also be able to transmit and forward received notes to a high-level user using another channel that the high-level and mid-level user are using. In this regard, the mid-level user is the gatekeeper for the low-level user's note to the high-level user, in that the low-level user is unauthorized and therefore unable to transmit a note to the high-level user. It should be understood that low-level, mid-level, and high-level are exemplary only, and any number of authorization levels may be generated, such as five levels, six levels, seven levels, etc. The authorization levels can be turned on at the beginning of the session and is not required to be enforced for every session, only the sessions that have this setting turned on.

A communication support system as described above is disclosed herein. The system includes a first and second computing device of a plurality of computing devices, the first and second computing devices being associated with a first and second user, respectively, wherein each computing device comprises: memory; and a processor operatively coupled to the memory, wherein the processor of the first computing device is configured to: transcribe an electronic note; and determine which computing devices of the plurality of computing devices the first computing device is authorized to transmit the electronic note to, wherein the determination is based on an authorization level associated with the first computing device and the plurality of computing devices; and transmit the electronic note to the second computing device only when the first computing device and the second computing device are associated with a proper authorization level.

The processor of the second computing devices is configured to receive the electronic note from the first computing device; determine which computing devices of the plurality of computing devices the second computing device is authorized to transmit the electronic note to; and transmit the electronic note to a third computing device only when the second computing device and the third computing device are associated with a proper authorization level. As another example, the first computing device is blocked from transmitting the electronic note to one or more of the plurality of computing devices. As a further example, the second computing device is blocked from transmitting the electronic note to one or more of the plurality of computing devices. As another example, the first computing devices is authorized to transmit the electronic note to the second computing device when the first and second computing devices are within a threshold distance from each other. As another example, the authorization levels of the plurality of computing devices is based on a hierarchy among the plurality of computing devices, wherein: the first computing device is lower in the hierarchy than the second computing device and a third computing device and the second computing device is lower in the hierarchy than the third computing device; wherein the first computing device is only authorized to communicate with computing devices that are at a level in the hierarchy commensurate with the first and second computing devices; and the second computing device is only authorized to communicate with computing devices that are at a level in the hierarchy commensurate with the first, second, and third computing devices. As a further example, the electronic notes that are transmitted are completely deleted from memory of the first and second computing devices at an end of a session. As another example, the electronic note is transmitted in real-time from the first computing device to the second computing device. In another example, when the electronic note is transmitted from the first computing device to the second computing device, the first and second computing devices include a comment section adjacent to the electronic note, the comment section configured to allow input from the first and second computing devices, such that the input is transmitted in real-time between the first and second computing devices.

A communication support method is also disclosed herein. The method includes transcribing, using a first computing device, an electronic note; and determining, using the first computing device, which computing devices of a plurality of computing devices the first computing device is authorized to transmit the electronic note to, wherein the determination is based on an authorization level associated with the first computing device; and transmitting, using the first computing device, the electronic note to a second computing device only when the first computing device and the second computing device are associated with a proper authorization level and satisfies the criteria.

As another example, the method includes receiving, using the second computing device, the electronic note from the first computing device; determining, using the second computing device, which computing devices of the plurality of computing devices the second computing device is authorized to transmit the electronic note to; and transmitting, using the second computing device, the electronic note to a third computing device of the plurality of computing devices only when the second computing device and the third computing device are associated with a proper authorization level. In another example, the first computing device is blocked from transmitting the electronic note to one or more of the plurality of computing devices. As a further example, the second computing device is blocked from transmitting the electronic note to one or more of the plurality of computing devices. As another example, the first computing devices is authorized to transmit the electronic note to the second computing device when the first and second computing devices are within a threshold distance from each other. As a further example, the authorization levels of the plurality of computing devices is based on a hierarchy among the plurality of computing devices, wherein: the first computing device is lower in the hierarchy than the second computing device and a third computing device and the second computing device is lower in the hierarchy than the third computing device; wherein the first computing device is only authorized to communicate with computing devices that are at a level in the hierarchy commensurate with the first and second computing devices; and the second computing device is only authorized to communicate with computing devices that are at a level in the hierarchy commensurate with the first, second, and third computing devices. As a further example, the electronic notes that are transmitted are completely deleted from memory of the first and second computing devices at an end of a session. In another example, the electronic note is transmitted in real-time from the first computing device to the second computing device. As a further example, when the electronic note is transmitted from the first computing device to the second computing device, the first and second computing devices include a comment section adjacent to the electronic note, the comment section configured to allow input from the first and second computing devices, such that the input is transmitted in real-time between the first and second computing devices.

In another embodiment, a non-transitory computer readable medium storing a program that is executable by one or more processors, the program includes the method of: transcribing an electronic note; and determining which computing devices of a plurality of computing devices a first computing device is authorized to transmit the electronic note to, wherein the determination is based on an authorization level associated with the first computing device; and transmitting the electronic note to a second computing device only when the first computing device and the second computing device are associated with a proper authorization level.

As a further example, the non-transitory computer-readable medium further includes receiving the electronic note at the second computing device from the first computing device; determining which computing devices of the plurality of computing devices the second computing device is authorized to transmit the electronic note to; and transmitting the electronic note to a third computing device only when the second computing device and the third computing device are associated with a proper authorization level.

DESCRIPTION OF THE PREFERRED EMBODIMENTS

The aspects, features and advantages of the present disclosure will be appreciated when considered with reference to the following description of preferred embodiments and accompanying figures. The following description does not limit the disclosure; rather, the scope is defined by the appended claims and equivalents. While certain processes in accordance with example embodiments are shown in the figures as occurring in a linear fashion, this is not a requirement unless expressly stated herein. Different processes may be performed in a different order or concurrently.

The present disclosure describes a system and method to securely transmit electronic notes between two or more computing devices. For example, using an application associated with a computing device, a session may be created that assigns individual users to a hierarchy of levels and channels. Each user may be assigned to a particular level within the hierarchy, and then users are able to communicate to each other based on the level that each user is associated with. For example, in one session there may be three levels within the hierarchy, the first level having the highest authority, second level being in the middle of the hierarchy, and the third level being the lowest within the hierarchy. Once a session is created a third level user may create an electronic note by transcribing a note on his or her computing device. A server in communication with the third level user's computing device may determine that the third level user is authorized to transmit the note to users and/or computing devices associated with the first level user(s) only after being viewed and passed on by the second level. Thus, the electronic note will be transmitted only to computing devices that are on the second level within the hierarchy until such time that user passes it on to the first level. Upon receipt of the electronic note, the one or more users associated with the second level may review the electronic note. If any of the second level users believe the electronic note is worth forwarding the electronic note to the one or more users associated with the first level of the hierarchy, then at least one of the second level users must forward the electronic note accordingly. In this regard, the third level users are prohibited or blocked from transmitting electronic notes to the first level users. As an alternative or additional embodiment, the third level user may only transmit the electronic note to a single second level user, who then solely determines whether or not to transmit the electronic note to one or more first level users.

Figure 1:
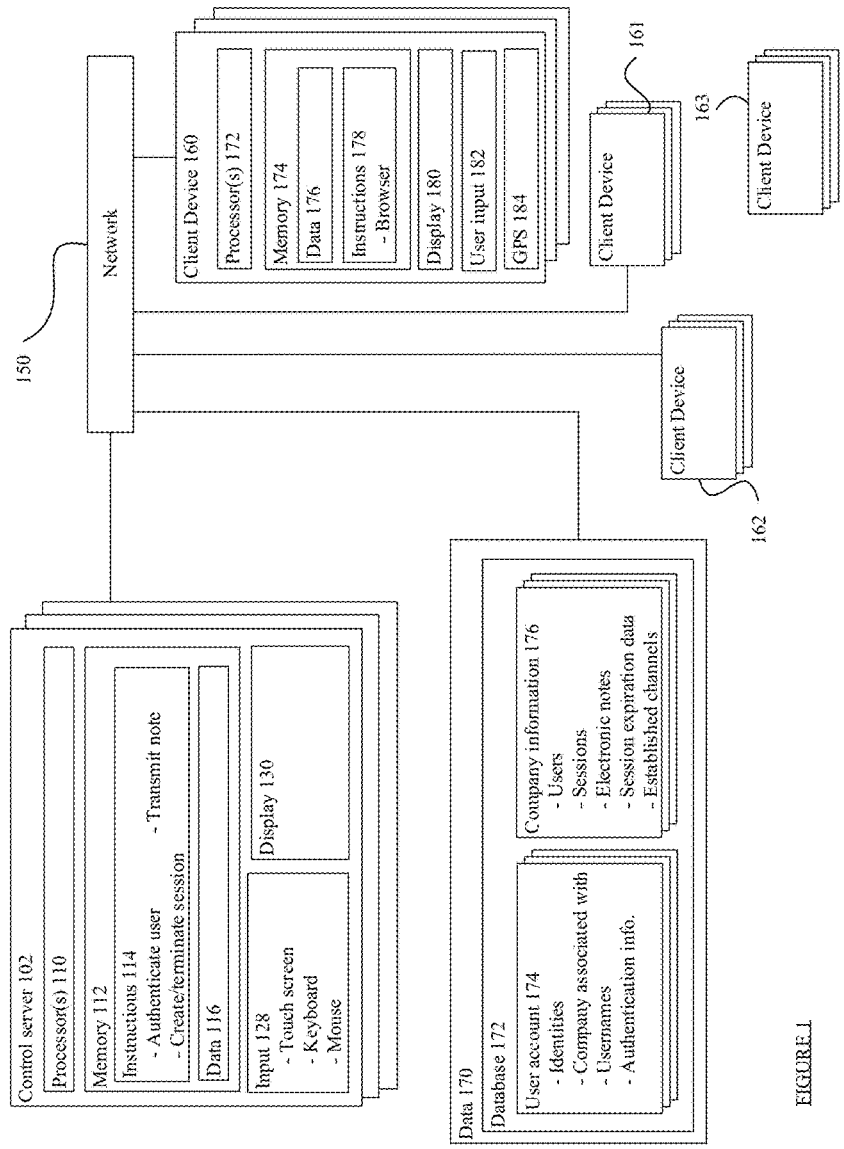
FIG. 1 is an exemplary overview of the communication support system in accordance with aspects of the disclosure.
Figure 2:
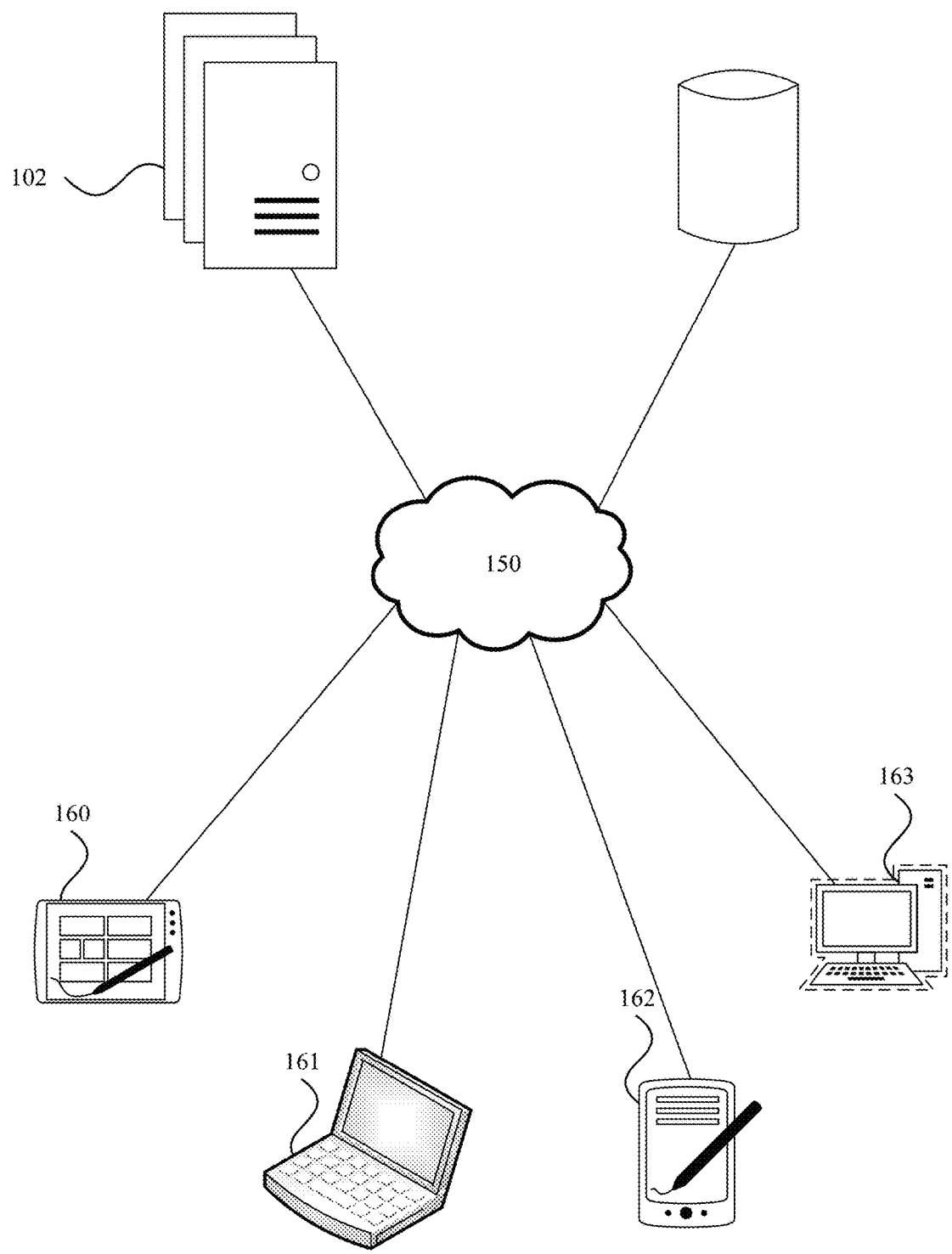
FIG. 2 illustrates devices of the system in FIG. 1 in accordance with aspects of the disclosure.

FIGS. 1 and 2 include example systems in which the features described above may be implemented. It should not be considered as limiting the scope of the disclosure or usefulness of the features described herein. In this example, the system can include control server 102 and computing devices 160-163. Control server 102 and each of the computing devices 160-163 can contain one or more processors, memory and other components typically present in computing devices.

The one or more processors 110 can be any conventional processor, such as a commercially available Central Processing Unit ("CPU"). Alternatively, processor 110 can be a dedicated component such as an Application-Specific Integrated Circuit ("ASIC") or other hardware-based processor. Although not necessary, the control server 102 may include specialized hardware components to perform specific computing processes, such as decoding video, matching image frames with images, distorting videos, etc. faster or more efficiently.

The memory 112 can include data 116 that can be retrieved, manipulated or stored by the one or more processors 110. The memory 112 can be of any non-transitory type capable of storing information accessible by the one or more processors 110, such as a hard-drive, memory card, Read Only Memory ("ROM"), Random Access Memory ("RAM"), Digital Versatile Disc ("DVD"), Compact Disc Read-Only Memory ("CD-ROM"), and write-capable memories.

The instructions 114 can be any set of instructions to be executed directly, such as machine code, or indirectly, such as scripts, by one or more processors 110. In that regard, the terms "instructions," "application," "steps" and "programs" can be used interchangeably herein. Instructions 114 can be stored in object code format for direct processing by the one or more processors 110, or in any other computing device language including scripts or collections of independent source code modules that are interpreted on demand or compiled in advance. As an example, the instructions 114 may include instructions to authenticate users, create and terminate sessions, and transmit electronic notes, as discussed in further detail below. Other functions, methods and routines of the instructions are explained in more detail below.

The data 116 can be retrieved, stored or modified by the one or more processors 110 in accordance with the instructions 114. For instance, although the subject matter described herein is not limited by any particular data structure, the data 116 can be stored in computer registers, in a relational database as a table having many different fields and records, or XML documents. The data 116 can also be formatted in any computing device-readable format such as, but not limited to, binary values, American Standard Code for Information Interchange ("ASCII") or Unicode. Moreover, the data 116 can comprise any information sufficient to identify the relevant information, such as numbers, descriptive text, proprietary codes, pointers, references to data stored in other memories such as at other network locations, or information that is used by a function to calculate the relevant data.

Referring to FIGS. 1 and 2, the control server 102 may communicate over a network 150 in order to communicate with a database 172. In this regard, although FIG. 1 illustrates data 170 and database 172 being accessible by the control server 102 over the network 150, it should be understood that the database 172 may alternatively be stored within data 116 of control server 102. Alternatively or as another example, the data 170 and the database 172 may be connected to the control server 102 via a physical connection or wireless connection such as via Wi-Fi. In this regard, the network 150 depicted in FIGS. 1 and 2 may be considered a Personal Area Network ("PAN"), Local Area Network ("LAN"), Wide Area Network ("WAN"), the Internet, etc.

Thus, the one or more processors, memory, control server, displays, etc. can actually comprise multiple processors, memories, control servers, displays, etc. that may or may not be stored within the same physical housing. For example, the memory 112 can be a hard drive or other storage media located in a housing different from that of control server 102. Accordingly, references to a processor, memory, computer, control server, etc. will be understood to include references to a collection of processors, memories, computers, control servers, etc. that may or may not operate in parallel. For example, the control server 102 may include a single server computing device or a load-balanced server farm. And although some functions described below are indicated as taking place on a single computing device having a single processor, various aspects of the subject matter described herein can be implemented by a plurality of computing devices, for example, communicating information over the network 150.

For instance, data 170 may include database 172 to store various information, which control server 102 may communicate with over the network 150. Information stored in database 172 includes user account information 174 such as user identity, company each user is associated with, usernames, and authentication information. Database 172 may further store company information 176, which may include at least user data, session data, electronic notes, session expiration data, and channels that have been established. Control server 102 can have the capability to read, write, and access data on database 172. Furthermore, database 172, control server 102, or both may operate using expandable cloud storage capabilities, such as a proprietary system.

Furthermore, as illustrated in FIGS. 1 and 2, control server may include multiple servers operating together. Thus, although the disclosure herein may refer to control server 102, it should be understood that specially programmed and dedicated servers may be performing certain tasks.

For instance, an HTTPS web server may be utilized to authenticate users, such as client computing devices 160-163, and also updating user settings and information. The HTTPS web server may use Secure Sockets Layer ("SSL") for security, such as to establish an encrypted link between a web server and a client browser. This use of SSL ensures that all data passed between the HTTPS web server and client browsers of the respective client computing devices remains private. Any data sent and received in accordance with the communication support system may be encrypted using AES-256 encryption with a secret cipher that is stored programmatically on client computing devices 160-163 and the HTTPS web server.

In addition, a Websocket server may be another server part of the control servers 102. The Web Socket server of the communication support system may be used to join sessions and sending and receiving electronic notes. For instance, the WebSocket server may also utilize SSL to ensure all data passed between the WebSocket server and the client computing devices 160-163 remain private. The WebSocket server may employ a WebSocket protocol to provide for fully duplex communication channels over a single TCP connection. WebSocket protocol may be utilized within web browsers associated with each client computing device 160-163 and HTTPS web servers. The WebSocket protocol allows for interactions between the browsers of the various authenticated client devices 160-163 facilitating real-time data transfer to and from the various authenticated client devices, the Web Socket server and the database 172.

The WebSocket server may also work in conjunction with a push notification mechanism to provide the various authenticated client computing devices 160-163 with the required information. As described in further detail below, the information generated by various client computing devices 160-163 is pushed to the other client computing devices 160-163 when these client computing devices 160-163 subscribe to various channels under the control of the Web Socket server. When new content is available on one of the channels, the secure Web Socket server pushes that information to the client computing devices 160-163. The WebSocket server used in accordance with the present invention will be secure.

Control server 102 can include display 130 (e.g., a monitor having a screen, a touchscreen, a projector, a television, or other device that is operable to display information), and user input 128. The user input 128 may include, for example, a keyboard, touchscreen, and mouse. Other input devices are also possible, such as a microphone. In this regard, the control server 102 may include only one or a plurality of the various input devices. The control server 102 may also include various modules and partitions that are stored in memory 112 and accessible by the one or more processors 110 to perform certain functions as described in more detail below.

Computing device 160 may also include one or more processors 172, memory 174, instructions 174, data 176, instructions 178, display 180, and user input 182, all of which may perform similarly as discussed above with respect to the one or more processors 110, memory 112, instructions 114, data 116, user input 128, and display 130 of the control server 102. Furthermore, although not shown client computing device 150 may also include input devices such as a keyboard, touchscreen, a mouse, or any combination thereof. In addition, as illustrated in FIG. 1 client computing device 150 includes camera 167 as an input device. In addition, client computing device 160 may also include a Global Positioning System ("GPS") device 184 or other geo-location identifying systems in order to identify the location of computing device 160. For example, the positioning component may include a GPS receiver to determine the particular device's latitude, longitude and/or altitude position. The location of the client computing devices may include an absolute geographical location, such as latitude, longitude, and altitude as well as relative location information, such as relative to a particular device or object. Although not shown, client computing devices 161-162 may also include one or more processors, memory, a display, various input devices, GPS etc. and overall may be constructed and configured to operate similarly to client computing device 160 as discussed above.

Similarly, processor 172 and memory 174 of client computing device 160 may be contained within the same housing or operate remotely from each other, and may include a plurality of components therein. For instance, processor 172, memory 174, and other components of client computing device 160 may be a plurality of processors, memories, etc., and should not be restricted to a single or particular type of processor or memory. Further, information collected on client computing device 160 may store temporarily in memory 174 (such as in Random Access Memory or on an internal hard drive) and be transmitted over network 150 to a remote database (not shown) in a hard drive, or alternatively transmitted to control server 102 and then to database 172. The client computing device 161-163 are also configured similarly to client computing device 160.

Client computing devices 160-163 may each comprise any type of computing devices. For instance, the client computing devices 160-163 may comprise a personal computing device or a mobile computing device capable of wirelessly exchanging data with each other or control server 102, such as via network 150. FIG. 2 illustrates exemplary computing devices of control server 102 and client computing devices 160-163. By way of example only, client computing devices 160-163 may be a mobile phone (e.g., Smartphone) or a device such as a wireless-enabled PDA, a tablet, a laptop, head-mountable device, Smart watch, or a netbook that is capable of obtaining and transmitting information via the Internet.

Control server 102 and client computing devices 160-163 can be at nodes of network 150 and capable of directly and indirectly communicating with other nodes of network 150. Although only a few computing devices are depicted in FIGS. 1-2, it should be appreciated that a typical system can include a large number of connected computing devices, with each different computing device being at a different node of the network 150. The network 150 and intervening nodes described herein can be interconnected using various protocols and systems, such that the network can be part of the Internet, World Wide Web, specific intranets, Wide Area Networks, or Local Area Networks. Network 150 can utilize standard communications protocols, such as Ethernet, Wi-Fi and HTTP, protocols that are proprietary to one or more companies, and various combinations of the foregoing, as discussed above with respect to the HTTPS Webserver and the Websocket server. Although certain advantages are obtained when information is transmitted or received as noted above, other aspects of the subject matter described herein are not limited to any particular manner of transmission of information.

The communication support system may begin by a user, such as the user associated with client computing device 163, being authenticated and then creating a session on his or her client computing device 163. Thus, the user may create a username and password or login to the system if he or she already has a username and password. Alternatively, the user may be authenticated using fingerprint identification, iris scan, pin code, pattern, etc., or any combination thereof. It should be understood that other users associated with client computing devices 160-162 may also create a session or other client computing device not shown.

Upon being authenticated, the user may create a session. For example, referring to FIG. 3, the user may type in a session name or number in a text box or input line 320. In addition, at this time the user may select a date and time using scroll 322 for the session to expire. In this regard, if the user is planning on attending a meeting, deposition, court hearing, trial, etc., then the user may select for the session to expire any time after the meeting is expected to be over, such as 5:30 p.m., or any time up until 11:59 p.m. that night. The user may then choose whether or not the session is private via private session switch 324 and whether or not to put channels on via channel switch 326. The private session may create additional security and privacy measures via certain criteria, such as only authorized users within that specific company or team are able to access the electronic notes transmitted, only users within a predetermined distance threshold are able to access the session, etc. Other criteria that work together or alone are possible as well. The channels may establish a hierarchy among the various users, so that each user's ability to communicate with another user is based on the level or position of that user within the hierarchy.

Figure 4:
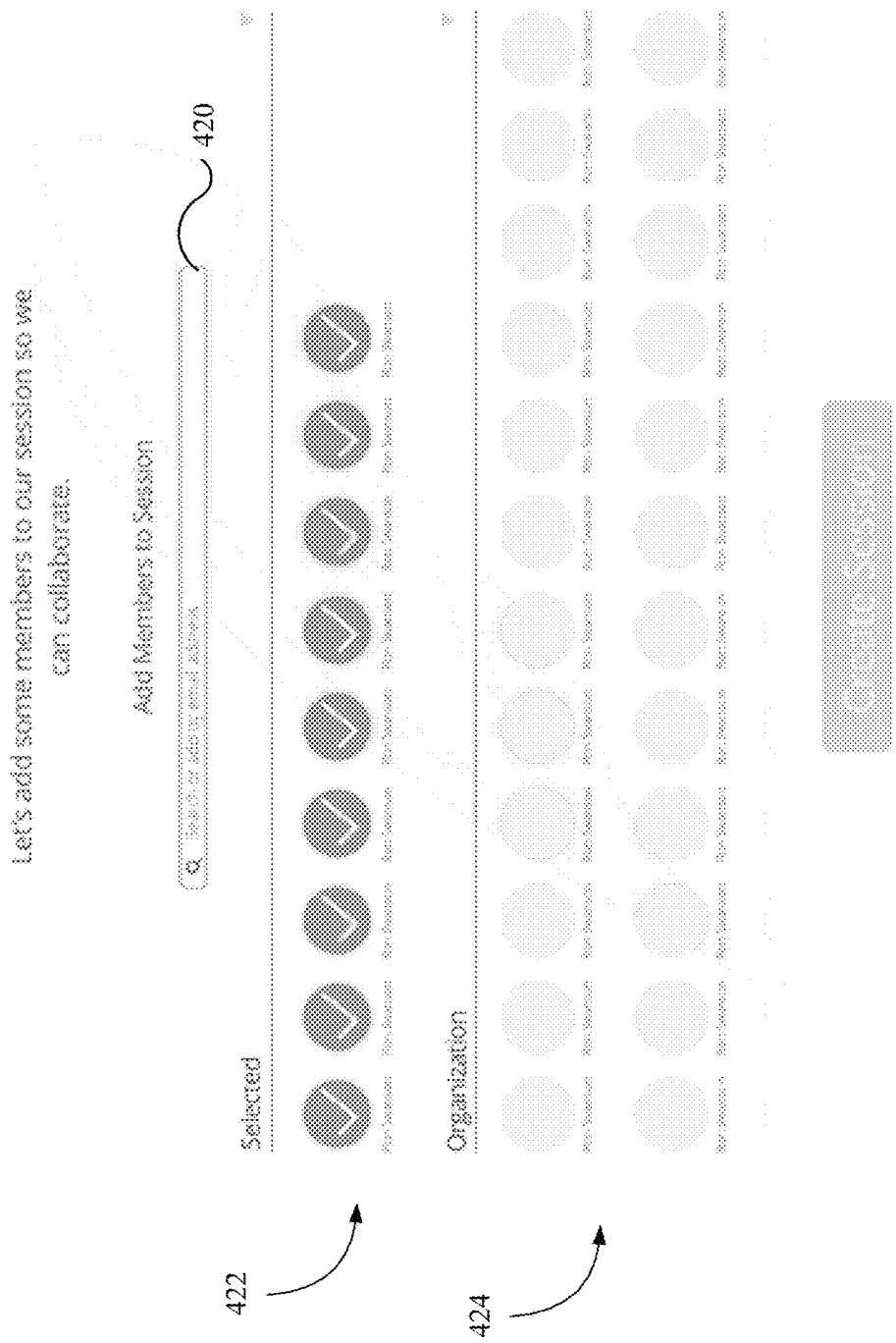
FIG. 4 is an example display of users being added to the session in accordance with aspects of the disclosure.

After the user creates the session, the user may add members or users to the created session, as illustrated in FIG. 4. For instance, the user may search for registered users by typing in a user's name or e-mail address in search textbox 430, in which case names will begin to populate therebelow. Alternatively or in addition, the user may select users in the organization section 424. In which case the user may select all users that he or she would like to include within the created session. As illustrated in selected section 422, all users that have been selected will be displayed.

Figure 5:
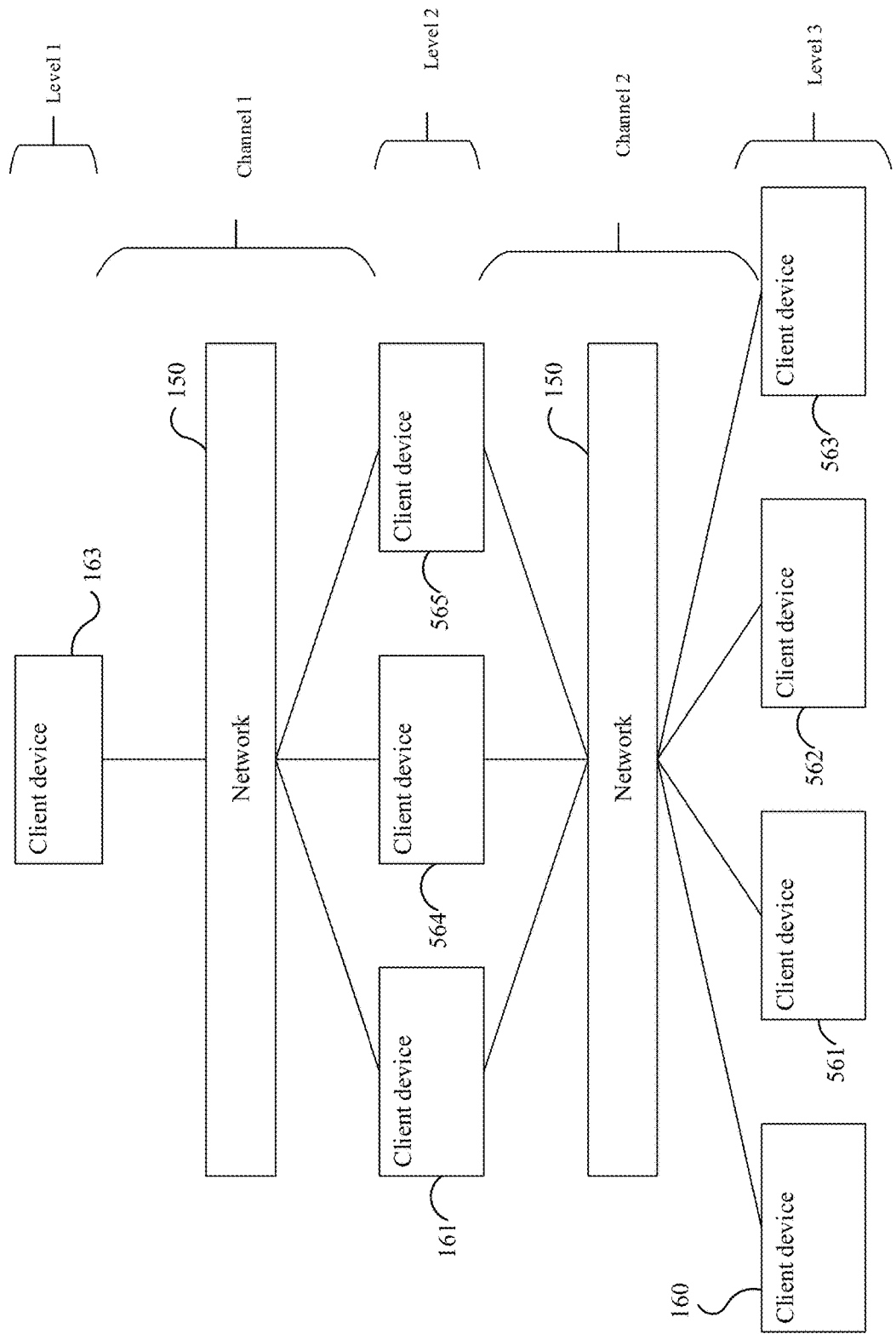
FIG. 5 depicts an overview of a hierarchy of levels and channels among a plurality of computing devices in accordance with aspects of the disclosure.

After a session is created, the hierarchy is fully established among the users. For instance and by way of example only, as illustrated in FIG. 5 each user is associated with a particular authorization level within the session and channels are created among and between the users. FIG. 5 depicts a plurality of client devices, each of which is associated with a particular user, at three different levels within the particular session that was created by the user associated with client computing device 163. In this example, the lowest level of authorization is at Level 3 and includes client computing devices 161 and 561-563. The level that includes greater authorization than Level 3 is Level 2, which includes client computing devices 161, 564 and 565. Finally, the level with the highest authorization level is Level 1, which includes only client computing device 163. The user associated with client computing device 163 may be a leader of a group, a public speaker, or the partner of a law firm whom is speaking at a trial, deposition, hearing, etc. Other examples are also possible. In this regard, the other users associated with client computing devices at Levels 2 and 3 may be providing support to the user associated with client computing device 163. Furthermore, only users that have access to the session, such as those whom were properly invited by the administrator or creator of the session, are able to transmit and access electronic notes within the given session.

The client computing devices that are capable and authorized to transmit electronic notes to levels above that of the given client computing device are those that are adjacent to each other within the levels of the hierarchy. For instance, in FIG. 5 Level 2 is adjacent to Level 1; therefore, the client computing devices associated with Level 2 are capable of transmitting notes to client computing devices at Level 1, which is client computing device 163 in the example of FIG. 5. Furthermore, Level 3 is only adjacent to Level 2; thus, client computing devices associated with Level 3 may only transmit electronic notes to client computing devices at Level 2, which is client devices 161, 564, and 565 in the example of FIG. 5.

However, since the structure is a hierarchy, it should be understood that client computing devices associated with a respectively higher level within the hierarchy may transmit electronic notes to respectively lower levels within the hierarchy. Thus, with respect to FIG. 5, client computing device 163 at Level 1 may transmit electronic notes to any and all devices below that level, which is Level 2 and Level 1 in the example of FIG. 5.

As indicated in FIG. 5, channels are established between and among the various levels. For instance, users associated with Levels 2 and 3 may communicate according to Channel 2, and users associated with Levels 1 and 2 may communicate with each other according to Channel 1. In this regard, each respective channel are secure in that no other users may intercept, receive, or view electronic notes that are transmitted among the channels. Thus, if the user associated with client computing device 160 transmits an electronic note to client computing devices associated with Level 2, then only those users that have been authorized and associated with Level 2 authorization will receive the electronic note.

Other client computing devices associated with Level 3 may also receive the electronic note transmitted by client computing device 160, including client computing devices 561-563. This may be helpful in that comments may be transcribed on electronic notes. Thus, if the user associated with client computing device 562 has more information to add to the electronic note transmitted by client computing device 160, then that user may transcribe below that note any additional comments, information, opinions, etc. Since each client computing device associated with Levels 2 and 3 received the electronic note from client computing device 160, these comments may be transcribed by any client computing device associated with Levels 2 and 3.

It should be understood that although only three levels of authorization are depicted in FIG. 5, any number of levels within the hierarchy and any number of users may be associated with each level within the hierarchy. For instance, there may be four levels, five levels, ten levels, twenty levels, etc. The amount of levels may depend on the given situation and the scale of operation that the organization is using the technology for. Furthermore, although FIG. 5 illustrates the number of users reducing as the hierarchy extends to the highest level of authorization, it should be understood that each level may be varied in terms of the amount of users. For instance, Level 3 may have two users, Level 2 may have ten users, and Level 1 may have four users. Thus, the purpose of the technology may still operate even if the amount of users does not fit within a clear and concise structure, as depicted in FIG. 5. Rather, the authorization levels may be dependent on the given jobs, roles, tasks, etc. assigned to each level of authorization.

Figure 6:
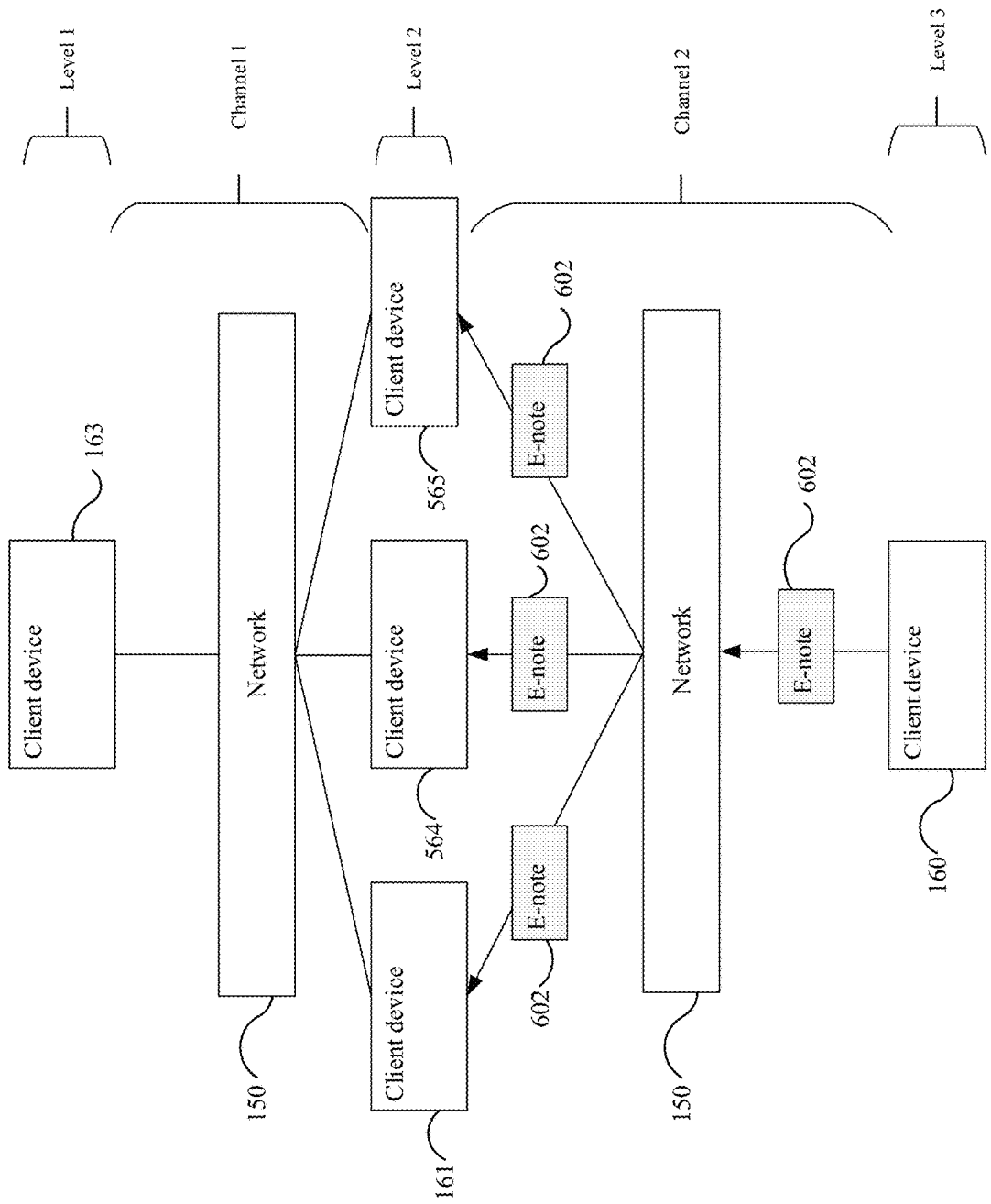
FIG. 6 illustrates an electronic note being sent from a low-level user to mid-level users in accordance with aspects of the disclosure.
Figure 7:
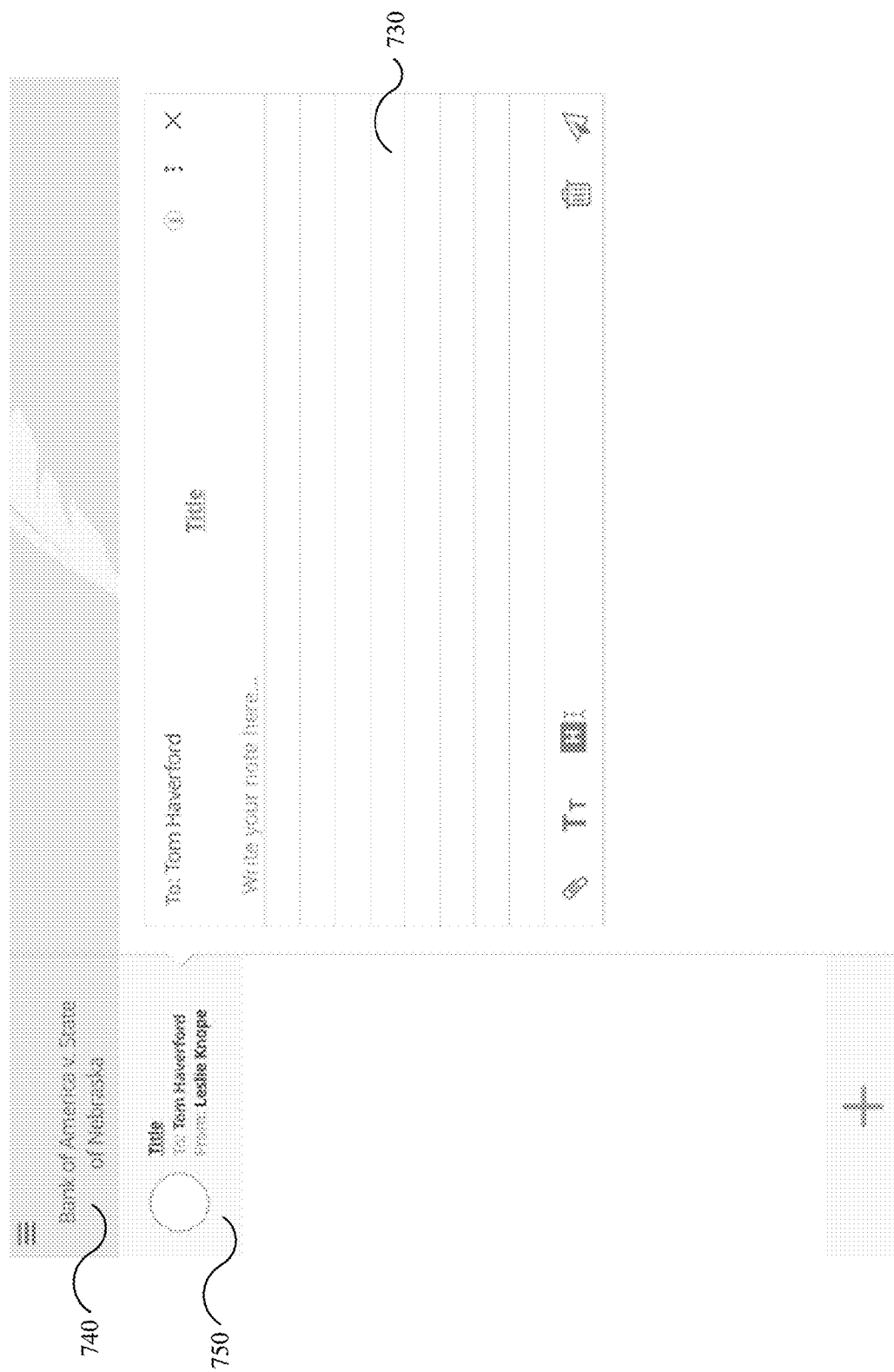
FIG. 7 is an example display of an electronic note being created in accordance with aspects of the disclosure.

Referring now to FIG. 6, the user associated with client computing device 160 transcribed and subsequently transmitted the electronic note 602 to Level 2 users, that is, client computing devices 161, 564, and 565. FIG. 7 provides an exemplary display associated with client computing device 160 to transcribe the electronic note 602. As illustrated in FIG. 7, the user may transcribe, such as by typing on a keyboard, a note within text area 730, which thereby would create the text of the electronic note 602. In addition or as an alternative, the electronic note may include handwriting, such as on a touchscreen display, links (e.g., Uniform Resource Locator), documents, photographs, graphics such as arrows and emojis, etc. The electronic note 602 is associated with a session named Bank of America v. State of Nebraska, as illustrated in session area 740. Furthermore, electronic note area 750 may provide a list of all electronic notes that have been created during that particular session.

Referring back to FIG. 6, when transmitting the electronic note 602 the electronic note may be transmitted via the network 150, through and verified by control server 102, and then transmitted via the network 150 to each client device at authorization Level 2. For instance, control server 102, such as the WebSocket server, may authenticate the user by verifying the authentication token associated with the client computing device 160, which the client computing device 160 received after signing in to his or her account. From here, the control server 102 communicates with database 172 via network 150 and stores the electronic note 602. Furthermore and in accordance with the details associated with the created session that was set-up via client computing device 163 as described with respect to FIGS. 3 and 4, other details about the electronic note 602 is stored as well. For instance, the expiration date and time of the electronic note 602 and who are the authorized client computing devices that are permitted to receive and access the electronic note 602 pursuant to each user's relationship in the hierarchy. Furthermore, the session name or title may be stored, such as session area 740 in FIG. 7, which is Bank of America v. State of Nebraska.

With respect to the expiration date and time of the electronic note 602, if the user associated with client computing device 163 indicated in creating the session that the electronic note will terminate at 11:59 p.m. on the same date, then the database 172 will store a parameter associated with that electronic note 602, which states that all information and data with respect to electronic note 602 will be deleted at 11:59 p.m. that day. The information that is deleted with respect to the electronic note 602 when 11:59 p.m. strikes may include the text of the electronic note 602, the time and date it was created, transmitted, and received by other client computing devices, the session name it was associated with, etc. In this regard, the memory file for all information pertaining to the electronic note 602 may be set to NIL and permanently deleted from all devices, computers and or servers that may have ever been part of a particular session.

Figure 3:
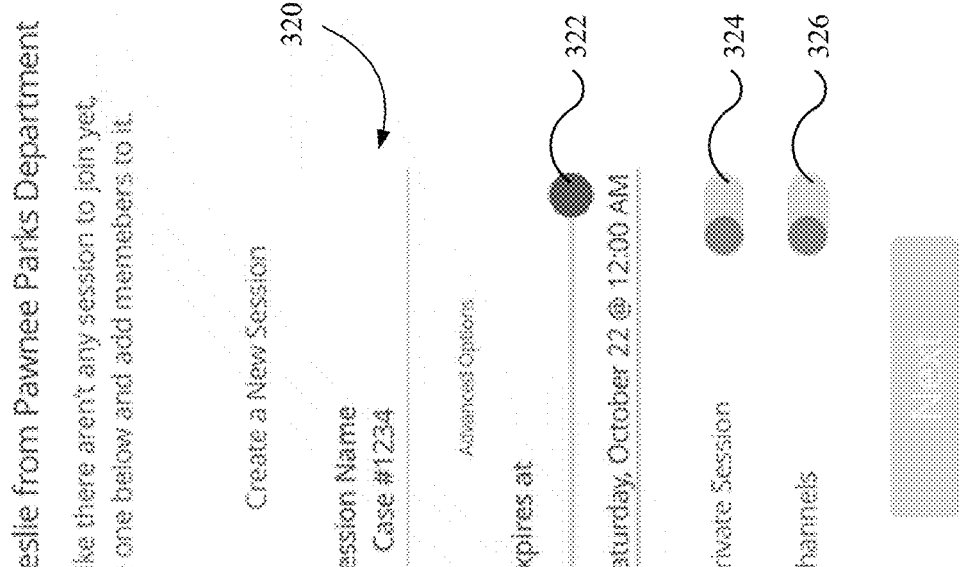
FIG. 3 is an example display of a session being created in accordance with aspects of the disclosure.

With respect to the database 172 storing information in regards to who is able to receive and access the electronic note 602, the database 172 may store at least one of which authentication levels and users within the hierarchy the electronic note 602 should be transmitted to. For instance, with respect to FIG. 6, since the electronic note 602 was created and sent via client computing device 160 at Level 3, then the control server 102 knows which client computing devices are authorized to receive the electronic note 602 from a Level 3 user. As discussed above, client computing devices that are positioned one respective level above that of the sending client computing device are authorized to receive the electronic note, in addition to client computing devices at the same authorization level as the sending client computing device. Thus and with respect to FIG. 6, along with the contents of electronic note 602, the database 172 will further store indications that Levels 2 and 3 authorization levels are authorized to receive the electronic note 602. However, in the event that the channels switch 326 was not selected at the creation of the session, as illustrated in FIG. 3, then the database 172 may not store indications that Levels 2 and 3 authorization levels are only authorized to receive the electronic note 602. In this regard, all users may simply be authorized to receive the electronic note 602 because the hierarchy structure is inactivated for that particular session.

It should further be understood that should another user be created and/or associated with one of the levels, such as Level 2 or 3, then the database 172 will be updated to reflect the client computing device associated with the new user to have authorization to electronic note 602 as well. For instance, if a new client computing device was added to Level 2 after, before, or contemporaneous with the creation of the electronic note 602, then the new client computing device will be authorized to receive and access the electronic note 602 as well. Further and as discussed in further detail below, based on the actions of the users associated with the client computing devices at Level 2, the database 172 may update the client computing devices and/or levels that are authorized to receive and access the client computing device 602, such as in the situation where one or more of the client computing devices at Level 2 choose to forward the electronic note 602 to Level 1 users.

After or contemporaneous with all relevant information of the electronic note 602 being stored within database 172, the control server 102, such as the Websocket server, sends push notifications to any and all authorized users. The control server 102 may also send a message to the original client device 160 that the electronic note 602 creation and transmission was a success.

As an alternative to or in addition to the electronic note 602 being transmitted through control server 102, the electronic note 602 may be transmitted via Bluetooth® between and among the client computing devices. For example, client computing device 160 may store security and authorization information within memory 174 which indicates which client computing devices the client computing device 160 can transmit the electronic note 602 to. For instance, the client computing device 160 may receive verified information regarding every client computing device that is associated with Levels 2 and 3; thereby providing the client computing device 160 with the relevant information as to who can receive the electronic note 602. Accordingly, the network 150 in this scenario may be Bluetooth®. Furthermore, if Bluetooth® is used as a means of communicating electronic note 602, then as an additional security criteria the client computing devices that should not receive the electronic note 602 may include a security measure that prohibits receiving the electronic note from any client computing device except those that are authorized. In this regard, client computing device 163 at Level 1 may block or otherwise prohibit receipt of any electronic notes that are transmitted from client computing device 160 and any other client computing devices at Level 3. However, client computing device 163 will permit or otherwise allow the receipt of electronic notes if they were transmitted via a Level 2 client computing device, such as client computing device 161. Alternatively or in addition, if prohibiting receipt of the electronic note 602 is not feasible, such as given the network employed, then by the electronic note 602 being properly encrypted, unauthorized devices will be unable to read the electronic note 602.

As an additional requirement that may be optional based on the settings of the created session, the communication support system, such as at control server 102, may determine whether or not certain criteria are satisfied before transmitting the electronic note 602. For instance, based on the client computing devices including GPS, the client computing devices themselves or the control server may verify that the client computing devices are within a threshold distance from each other. For instance, even if client computing device 161 is at a proper authorization Level 2, the communication support system may set further requirement criteria in order for the client computing device 161 to receive the electronic note. One criteria may be that the client computing device 161 is within a threshold distance to client computing device 160, such as five feet, ten feet, one mile, etc. This may provide heightened security to assure that no one else could receive access the electronic note 602. Other criteria are also possible and customizable by the creator of the session. For instance, additional security measures can be utilized such as Networking and Cryptography library ("NaCl") Encryption related to encryption and key agreement protocols and advanced libraries and frameworks designed to ensure the highest level of security and encryption. Encryption protocols may be used to encode all information or notes in such a way so only authorized parties can access it. Encryption does not in and of itself prevent interference, but is utilized to deny any information to potential interceptors. By utilizing highest industry standard encryption schemes, plaintext messages or information is encrypted using an encryption algorithm, generating ciphertext that can only be read if decrypted. For technical reasons, an encryption scheme usually uses a key generated by an algorithm. It is in principle possible to decrypt the message without possessing the key, but, for a well-designed encryption scheme, large computational resources and skill are required. An authorized recipient can easily decrypt the message with the key provided by the originator to recipients, but not to unauthorized interceptors.

Should one or more of the client computing devices at Level 2 approve of the contents of the electronic note 602, then that respective client computing device may approve and thereby forward the electronic note 602 to the recipient who resides at Level 1. In this regard, the electronic note 602 created by client computing device 160 may have been transmitted to a single user, such as a single user associated with Level 1. In this scenario, after the Level 2 user approved the electronic note 602 for forwarding, the electronic note 602 may only be transmitted to the originally designated user, such as the user associated with the client computing device 163. Thus, in the event there are a plurality of users associated with Level 1, then only client computing device 163 would receive the electronic note 602. However, each user associated with Level 2 may still receive the electronic note 602 in order for each Level 2 user to read and approve of the electronic note 602. Alternatively, the communication support system may be configured so that only one or certain users associated with Level 2 are authorized to receive the electronic note 602. For instance, particular users at Level 3 may be associated with particular users at Level 2, such as in terms of expertise, fields of knowledge, etc., and the recipient's ID is used to retrieve the encrypted value. Alternatively or in addition, particular users at each level may select whom to transmit electronic notes to.

Furthermore, in the event that there are greater than three levels, such as six levels, then similar configurations described above would still apply. For instance, if a level 6 user wants a specific user at level 3 to receive an electronic note, then any user at level 4 may receive the electronic note to review, approve, and forward. When the level 4 user approves of the electronic note, only the original intended recipient that is at level 3 would receive the electronic note. Alternatively, only certain users at 4 would receive the electronic note from the level 6 user and be able to approve of and forward to the electronic note.

Figure 8:
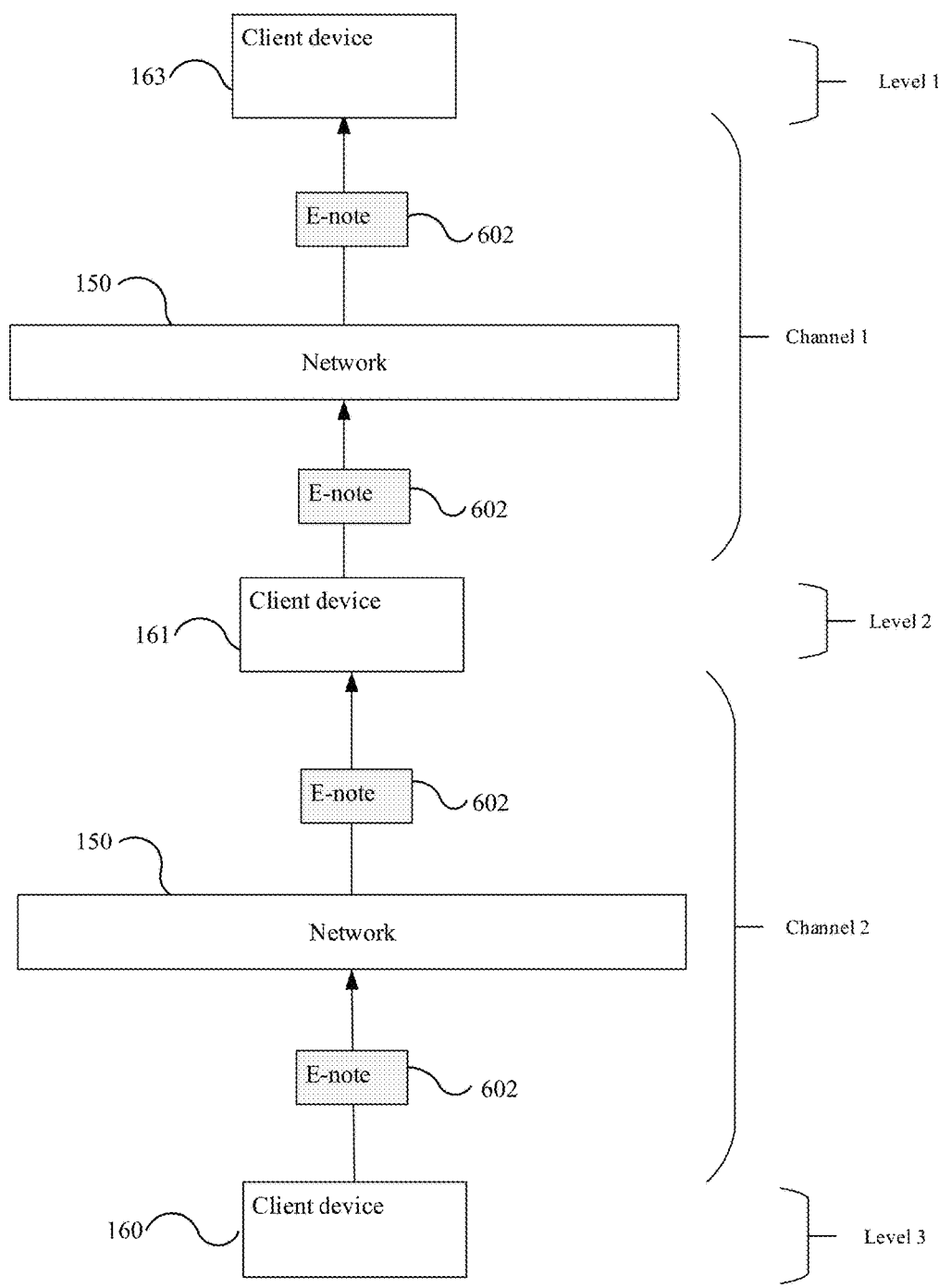
FIG. 8 illustrates a mid-level user forwarding the electronic note to a high-level user in accordance with aspects of the disclosure.

Referring now to the example in FIG. 8, the client computing device 161 opted to forward the electronic note 602 to Level 1 client computing devices, which in this scenario is only client computing device 163. In this regard, the electronic note 602 may be transmitted to client computing device 164 similarly as described above with respect to the transmission of the electronic note from client computing device 160 to the Level 2 and Level 3 client computing devices. For instance, the electronic note 602 may be transmitted over the network 150, through control server 102, stored within database 172, and then ultimately transmitted to client computing device 164. Alternatively, the electronic note 602 may be transmitted to client computing device 164 via Bluetooth® as discussed above. It should be understood that although only client computing device 163 is depicted in FIG. 8, if additional client computing devices were associated with Level 1 then those devices would similarly receive the electronic note 602. Furthermore, any additional client computing devices that are added to each respective Level may receive any and all electronic notes that were transmitted prior to, contemporaneous with, or after the transmission of the electronic note. Thus, if a fourth, fifth, etc. client computing device were to be added to Level 2, then the added one or more client computing devices would receive any notes that were transmitted in that session intended for that user. Additionally, the top level user in a session can temporarily promote any user in the session as an acting Level 1 for that brief period of time, enabling that top user to act as the filter for the acting lead of the session. For example, if a Level 5 user addresses the court and speaks at the podium, the current Level 1 (e.g., the lead attorney) can promote that user to Acting Level 1 which will enable the original Level 1 to review and filter any notes that are being sent to the temporary Acting level 1 for that specific agenda item within the session.

For example, when the new user chooses to join a session, the client computing device sends a request through the control server 102, such as the WebSocket server, containing the authentication token, requesting all electronic notes that are available for the user based on his or her authorization level within the hierarchy. The control server 102 could utilize items such as JavaScript Objective Notations ("JSON") formatted records back to the client computing device containing the electronic notes. Using JSONs is the most common data format that is used for asynchronous server communications to devices while taking into account security and interoperability considerations. The control server 102 may also mark the user as online in the database 172.

As mentioned above, the session may automatically end at a given date and time. The session creator may choose a particular date and time to end the session. Alternatively or in addition, the system may be configured to automatically end all sessions by midnight of the day that the session was created. When the session ends, all electronic notes stored in the database 172, control server 102, and each client computing device may be permanently deleted and inaccessible. This provides for additional security and comports the communication support system disclosed herein to act similar to physical paper notes. For example, physical notes may be discarded or shredded and never accessible again; however, even physical notes can be retrieved by opposing parties, which makes the present communication support system advantageous since there will be no physical notes that can inadvertently be dropped for opposing parties to retrieve.

In addition to a session ending at a particular time, users may be ejected from or willfully leave sessions. For instance, an owner or creator of a particular session has authority to eject particular users from a session. In this scenario, all electronic notes stored on the ejected user's client device may be deleted and irretrievable. Similarly, should a user willfully leave or otherwise sign-out from a session, then all electronic notes stored on the user's client computing device will be deleted and irretrievable. Should the user be given access to the session again, then the user may again have access to electronic notes that are commensurate with that given user's authentication level, as discussed above.

Figure 9:
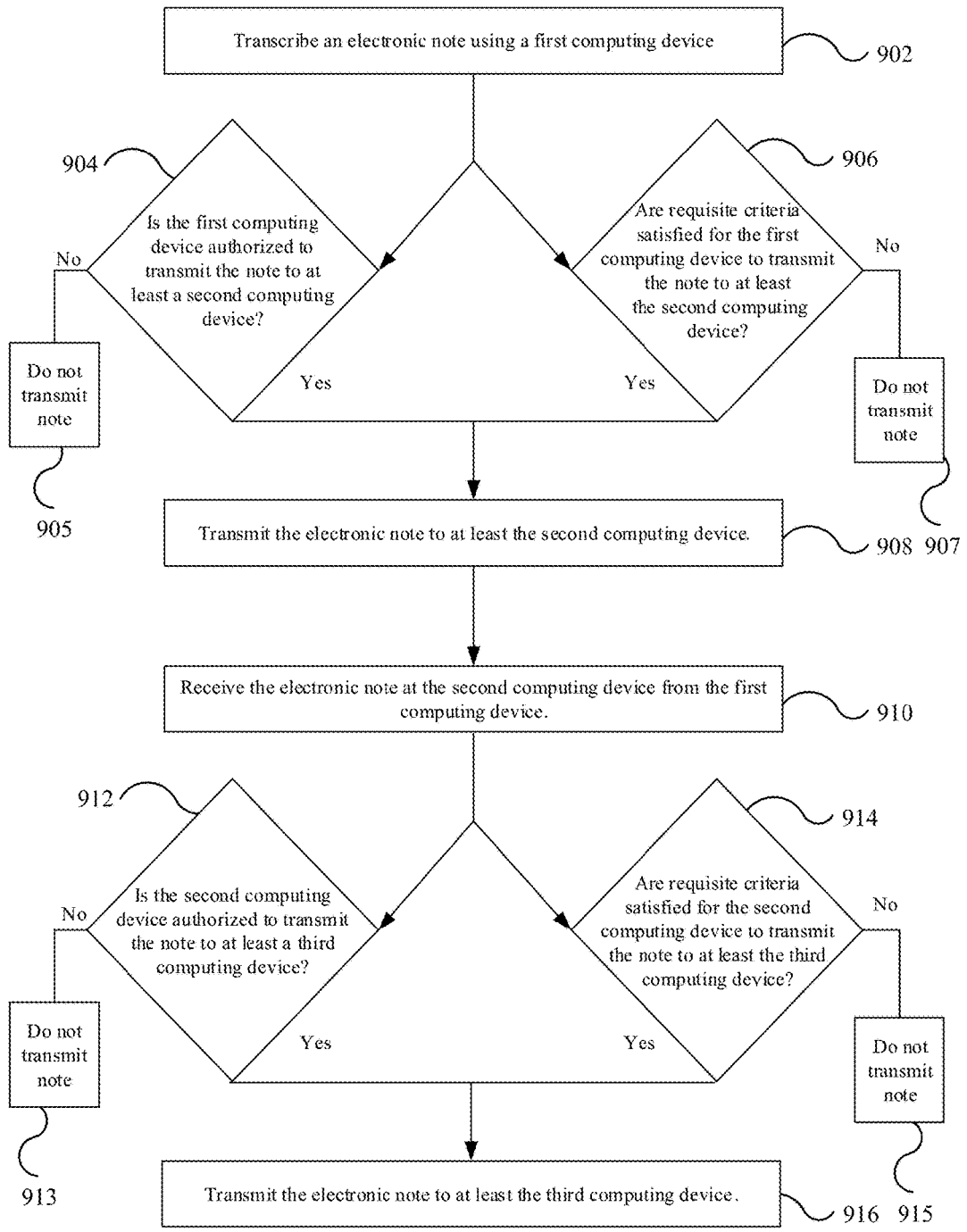
FIG. 9 is a flowchart of an exemplary system and method in accordance with aspects of the disclosure.

FIG. 9 provides an exemplary flowchart of the communication support system described above. For instance, at step 902 a user, using a first client computing device, transcribes an electronic note. The electronic note may be transcribed using a keyboard associated with the client computing device, writing with a finger or stylus, etc. on a touchscreen display of the client computing device, voice recognition to text, etc.

After the electronic note is transcribed and the user wants to transmit the electronic note to a second client computing device associated with a higher level within the hierarchy, two verification steps may be performed. The two verification steps may be performed at the control server 102 or at one or more of the client computing devices, such as the first and second client computing devices. For instance, the communication support system at step 904 will first determine whether or not the first client computing device is authorized to transmit the electronic note to at least the second client computing device. In this regard, the communication support system may consider what level within the hierarchy the first client computing device is at, and then which level the second client computing device is associated with. If the communication support system determines that the second client computing device is one respective level above that of the first client computing device within the hierarchy or at the same level of the first client computing device, then this prong will be satisfied.

Before, after, or contemporaneous with the decision at step 904, the communication support system at step 906 may similarly determine whether requisite criteria are satisfied to transmit the electronic note to at least the second client computing device. This verification of the criteria may be a secondary optional requirement, and may not be performed. The criteria may include, for example, whether the first and second client computing devices are within a threshold distance from each other. For instance, even if the second client computing device is permitted to receive the electronic note based on the authorization level associated therewith, the second client computing device may not be nearby. If, for example, the communication support system is being implemented in a courtroom environment, then the second client computing device not being within a threshold distance to the parties may thereby prohibit that device from receiving the electronic notes.

If the decision to either 904 or 906 are no, then the electronic note from the first computing device may not be transmitted, as illustrated at steps 905 and 907. As mentioned above, however, the step at 906 may be optional only based on the creator of the session. Thus, then if the session does not consider other criteria, such as threshold distance or proper authentication keys, being necessary, then step 906 may not be performed and only the decision at 904 will decide whether or not the electronic note is transmitted.

If either the decisions at steps 904 and 906 are both yes, then the communication support system may move on to step 908. At step 908, the electronic note from the first computing device is transmitted to at least the second client computing device over the network. At step 910, at least the second client computing device receives the electronic note from the first client computing device. Similar to the steps at 904 and 906, at steps 912 and 914, respectively, the communication support system determines whether or not the second client computing device is authorized to forward or otherwise transmit the electronic note to at least a third client computing device, and whether or not the second client computing device satisfies requisite criteria. If the decision to step 912 or 914 is no, then the electronic note will not be transmitted as indicated at steps 913 and 915. Conversely, if the decisions to steps 912 and 914 is yes, then the electronic note will be transmitted to at least the third client computing device at step 916. It should be understood that the verification of criteria being satisfied at step 914 is optional, and may only be verified if the user selected this option when creating the session, or this requirement was otherwise selected in settings after creation of the session.

Although not shown in FIG. 9, the third client computing device may then determine if a fourth client computing device should receive the electronic note. The process in FIG. 9 may continue up until the highest authorization level within the hierarchy is reached.

Figure 10:
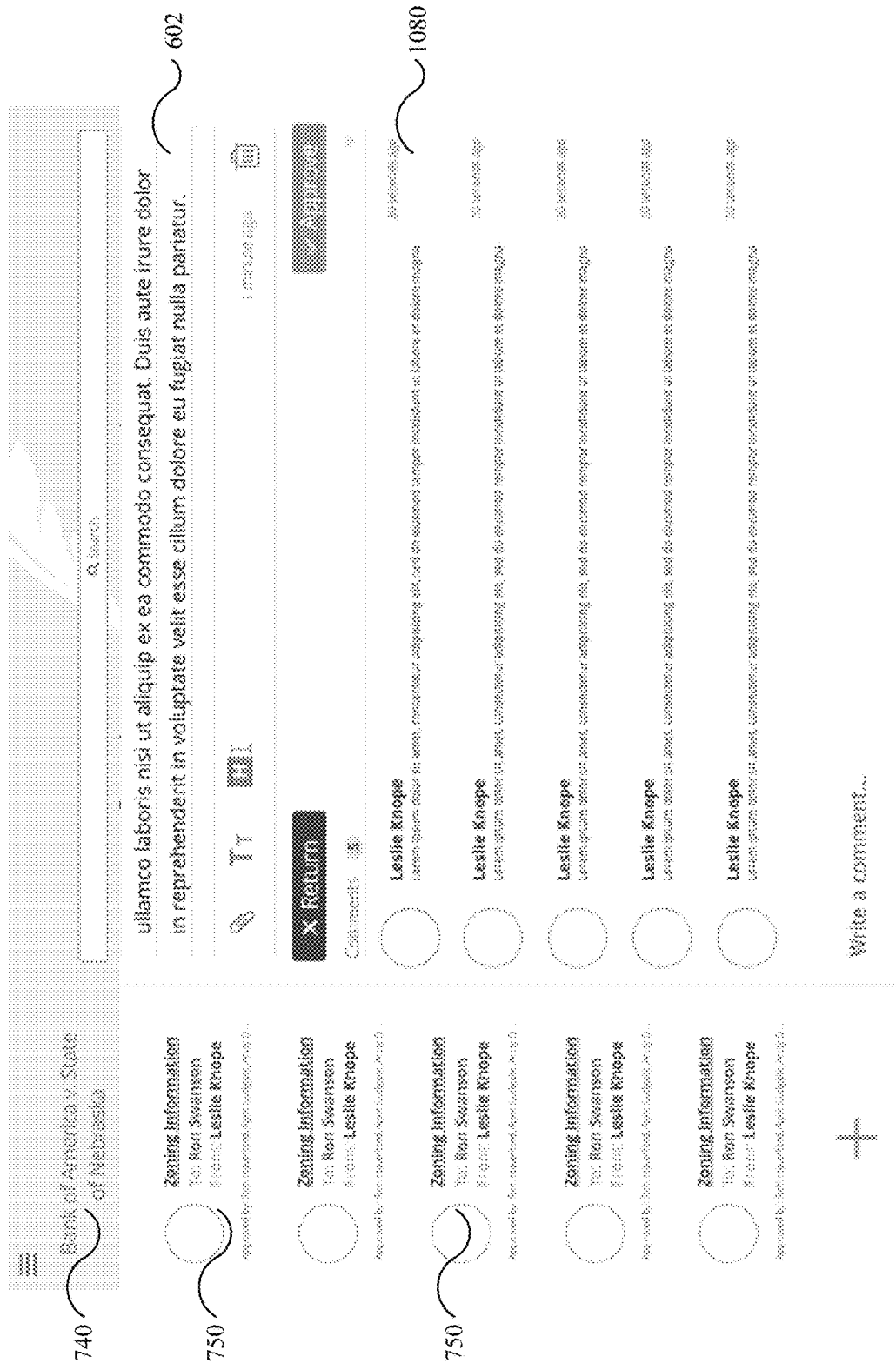
FIG. 10 is an example display of a comment section on the electronic note in accordance with aspects of the disclosure.

As another embodiment, comments may be made for each respective electronic note. Referring to FIG. 10, text area 730 is displayed for electronic note 602, and therebelow is a comment section 1080 from various users associated with authorized client computing devices. In this regard, users that were authorized to view the electronic note 602, are authorized to create comments for the electronic note as well. This is similar to when physical paper notes, such as post-its, are used between people in that each individual is able to further write comments or additional notes on a given post-it. This also facilitates comprehensive in-person discussions among all relevant and authorized parties.

As a further embodiment, a writing utensil may include electronic components that automatically sense writing and create an electronic note based on movement of the writing utensil. The writing utensil may be a pencil, pen, stylus, etc. that includes various sensors such as accelerometers, gyroscopes, etc. that are able to transmit movement of the writing utensil into an electronic note. For instance, a user may use a pen on legal pad or a post-it to write a note. Alternatively, if a user has a stylus then they may simply write a note on a desk, his or he hand, or any surface. The sensors contained within the writing utensil transmits the writing to electronic note form. The electronic note may then be transmitted similarly as described above, such as over the network, Bluetooth®, through the control server, saved within the database, and then transmitted to all authorized parties. It should be understood the writing utensil may have been authenticated so as to be associated with a given; thus, the writing utensil is the client computing device as discussed above, and thereby replaces a tablet, Smartphone, etc.

As another embodiment, the electronic note may be immediately and in real-time transmitted to other authorized client computing devices. For example, as a user is transcribing the electronic note on his or her client computing device, the authorized client computing devices receive the text as the note is being written. Thus, similar to when a person is actually writing a note on a notepad, post-it, etc. and others are able to see, the other users are able to see the text of the electronic note on their respective client computing devices as the user is transcribing. This real-time communication may be done if the note is transcribed via keyboard, writing on a touchscreen, voice-to-text recognition, etc. Even further, the real-time transmission may apply to the example provided above with respect to the writing utensil including various sensors therein, such as a stylus, pen, pencil, etc., which automatically transcribes an electronic note via a typical writing utensil.

Advantages of the present disclosure include the ability for a hierarchical structure to communicate effectively amongst each other. The communication support system allows for the lead speaker, such as the speaking attorney at a trial or hearing, to receive effective and important communications after the information has been sifted through and approved the relevant people. For instance, if a paralegal has a piece of information that he or she believes is favorable to the speaker, then the paralegal may transmit the electronic note to a junior attorney. The junior attorney may choose to reject notion in the electronic note if he or she disagrees with the notions therein, or forward the electronic note to a senior attorney. The senior attorney may then similarly reject the note back to the junior attorney, or approve of and forward the electronic note to the lead attorney who is speaking. In addition, throughout the entire process each participant within the chain may create comments for the electronic note. For instance, if the senior attorney has a question or comment about the electronic note, then the senior attorney can comment directly thereon, thereby immediately having every authorized user to view the comment and react thereto. Therefore, the lead attorney or speaker will receive the note once it has been properly vetted and verified.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "including" and the like) should not be interpreted as limiting the invention to the specific examples; rather, the examples are intended to illustrate only one of many possible embodiments.

The invention claimed is:

1. A system, comprising:
a first and second computing device of a plurality of computing devices, the first and second computing devices being associated with a first and second user, respectively, wherein each computing device comprises:
memory; and
a processor operatively coupled to the memory, wherein the processor of the first computing device is configured to:
transcribe an electronic note; and
determine which computing devices of the plurality of computing devices the first computing device is authorized to transmit the electronic note to, wherein:
the determination is based on an authorization level associated with the first computing device and the plurality of computing devices, the authorization levels associated with each of the plurality of computing devices is based on a hierarchy among the plurality of computing devices, and
the hierarchy is created at a beginning of a communication session, and the authorization levels associated with each of the plurality of computing devices is user-selected and assigned when the communication session is created, such that future communications between the plurality of computing devices is based on the user-selected and assigned authorization levels, and wherein the communication session is assigned a time to expire; and
transmit the electronic note to the second computing device only when the first computing device and the second computing device are associated with a proper authorization level.

2. The system of claim 1, wherein a processor of the second computing device is configured to:
receive the electronic note from the first computing device;
determine which computing devices of the plurality of computing devices the second computing device is authorized to transmit the electronic note to based on the user-selected and assigned authorization levels; and
transmit the electronic note to a third computing device only when the second computing device and the third computing device are associated with a proper authorization level.

3. The system of claim 1, wherein the first computing device is blocked from transmitting the electronic note to one or more of the plurality of computing devices.

4. The system of claim 1, wherein the first computing devices is authorized to transmit the electronic note to the second computing device when the first and second computing devices are within a threshold distance from each other.

5. The system of claim 1, wherein:
the first computing device is lower in the hierarchy than the second computing device and a third computing device and the second computing device is lower in the hierarchy than the third computing device;
wherein the first computing device is only authorized to communicate with computing devices that are at a level in the hierarchy commensurate with the first and second computing devices;
the second computing device is only authorized to communicate with computing devices that are at a level in the hierarchy commensurate with the first, second, and third computing devices; and
wherein the first, second, and third computing devices are mobile computing devices.

6. The system of claim 1, wherein the electronic notes that are transmitted are completely deleted from memory of the first and second computing devices at an end of a session.

7. The system of claim 1, wherein the electronic note is transmitted in real-time from the first computing device to the second computing device.

8. The system of claim 1, wherein when the electronic note is transmitted from the first computing device to the second computing device, the first and second computing devices include a comment section adjacent to the electronic note that was created by the first computing device, the comment section configured to allow input from the first and second computing devices, such that the input is transmitted in real-time between the first and second computing devices.

9. The system of claim 1, wherein:
only computing devices invited to the communication session are permitted to transmit and access electronic notes;
the authorization levels assigned to each of the plurality of computing devices is based on a user that is associated with the computing device, such that the hierarchy created by the authorization levels is based on a level or position of the user operating the computing device;
users assigned with a relatively higher authorization level is permitted to transmit to and receive electronic notes from all users at a same authorization level and every relatively lower authorization level; and
users assigned with a relatively lower authorization level is permitted to transmit electronic notes to users at the same authorization level and only one authorization level directly above that relatively lower authorization level.

10. The system of claim 9, wherein the communication session is associated with criteria to enhance security for the transmission of electronic notes among the plurality of users within the communication session, wherein the criteria includes only users associated with a company are invited into the communication session.

11. A method, comprising:
  transcribing, using a first computing device, an electronic note; and
  determining, using the first computing device, which computing devices of a plurality of computing devices the first computing device is authorized to transmit the electronic note to, wherein:
    the determination is based on an authorization level associated with the first computing device, the authorization levels associated with each of the plurality of computing devices is based on a hierarchy among the plurality of computing devices, and
    the hierarchy is created at a beginning of a communication session, and the authorization levels associated with each of the plurality of computing devices is user-selected and assigned when the communication session is created, such that future communications between the plurality of computing devices is based on the user-selected and assigned authorization levels, and wherein the communication session is assigned a time to expire; and
  transmitting, using the first computing device, the electronic note to a second computing device only when the first computing device and the second computing device are associated with a proper authorization level.

12. The method of claim 11, further comprising:
  receiving, using the second computing device, the electronic note from the first computing device;
  determining, using the second computing device, which computing devices of the plurality of computing devices the second computing device is authorized to transmit the electronic note to based on the user-selected and assigned authorization levels; and
  transmitting, using the second computing device, the electronic note to a third computing device of the plurality of computing devices only when the second computing device and the third computing device are associated with a proper authorization level.

13. The method of claim 12, wherein the second computing device is blocked from transmitting the electronic note to one or more of the plurality of computing devices.

14. The method of claim 11, wherein the first computing devices is authorized to transmit the electronic note to the second computing device when the first and second computing devices are within a threshold distance from each other.

15. The method of claim 11, wherein:
  the first computing device is lower in the hierarchy than the second computing device and a third computing device and the second computing device is lower in the hierarchy than the third computing device;
  wherein the first computing device is only authorized to communicate with computing devices that are at a level in the hierarchy commensurate with the first and second computing devices; and
  the second computing device is only authorized to communicate with computing devices that are at a level in the hierarchy commensurate with the first, second, and third computing devices.

16. The method of claim 11, wherein the electronic notes that are transmitted are completely deleted from memory of the first and second computing devices at an end of a session.

17. The system of claim 11, wherein the electronic note is transmitted in real-time from the first computing device to the second computing device.

18. The system of claim 11, wherein when the electronic note is transmitted from the first computing device to the second computing device, the first and second computing devices include a comment section adjacent to the electronic note that was created by the first computing device, the comment section configured to allow input from the first and second computing devices, such that the input is transmitted in real-time between the first and second computing devices.

19. A non-transitory computer readable medium storing a program that is executable by one or more processors, the program includes the method of:
  transcribing an electronic note; and
  determining which computing devices of a plurality of computing devices a first computing device is authorized to transmit the electronic note to, wherein:
    the determination is based on an authorization level associated with the first computing device, the authorization levels associated with each of the plurality of computing devices is based on a hierarchy among the plurality of computing devices, and
    the hierarchy is created at a beginning of a communication session, and the authorization levels associated with each of the plurality of computing devices is user-selected and assigned when the communication session is created, such that future communications between the plurality of computing devices is based on the user-selected and assigned authorization levels, and wherein the communication session is assigned a time to expire; and
  transmitting the electronic note to a second computing device only when the first computing device and the second computing device are associated with a proper authorization level.

20. The non-transitory computer-readable medium of claim 19, further comprising:
  receiving the electronic note at the second computing device from the first computing device;
  determining which computing devices of the plurality of computing devices the second computing device is authorized to transmit the electronic note to based on the user-selected and assigned authorization levels; and
  transmitting the electronic note to a third computing device only when the second computing device and the third computing device are associated with a proper authorization level.

* * * * *